(12) United States Patent
Hayes

(10) Patent No.: US 6,381,864 B1
(45) Date of Patent: May 7, 2002

(54) GAUGE ESPECIALLY ADAPTED FOR MEASURING THE FRAME HEIGHT OF RACE CARS AND METHOD OF USING THE SAME

(75) Inventor: Michael L. Hayes, 6066 Mooretown Rd., Williamsburg, VA (US) 23188

(73) Assignee: Michael L. Hayes, Williamsburg, VA (US)

( * ) Notice: Subject to any disclaimer, the term of this patent is extended or adjusted under 35 U.S.C. 154(b) by 0 days.

(21) Appl. No.: 09/832,487

(22) Filed: Apr. 11, 2001

Related U.S. Application Data

(63) Continuation-in-part of application No. 09/439,460, filed on Nov. 15, 1999.

(51) Int. Cl.[7] .................................................. G01B 3/16
(52) U.S. Cl. ........................ 33/807; 33/600; 33/558.01
(58) Field of Search ........................ 33/783, 806, 807, 33/808, 809, 810, 832, 833, 613, 600, 542, 544.4, 542.1, 558.01, 558.4

(56) References Cited

U.S. PATENT DOCUMENTS

| | | | | |
|---|---|---|---|---|
| 2,706,859 A | * | 4/1955 | Johnson ........................ 33/542 |
| 3,571,934 A | * | 3/1971 | Buck, Sr. ...................... 33/832 |
| 3,802,084 A | * | 4/1974 | Fortado, Jr. ................... 33/613 |
| 3,895,356 A | | 7/1975 | Kraus |
| 3,945,121 A | * | 3/1976 | Uchino ......................... 33/810 |
| 4,294,016 A | | 10/1981 | Wilkerson |
| 4,389,783 A | * | 6/1983 | Sakata et al. .................. 33/806 |
| 4,458,423 A | * | 7/1984 | Sakata et al. .................. 33/832 |
| 4,513,508 A | | 4/1985 | Jarman et al. |
| 4,660,291 A | * | 4/1987 | Dehn ........................... 33/613 |
| 4,679,326 A | | 7/1987 | Takizawa et al. |
| 4,734,992 A | * | 4/1988 | Scott ........................ 33/558.01 |
| 4,771,544 A | | 9/1988 | Riutta |
| 4,821,420 A | * | 4/1989 | Maykel ........................ 33/832 |
| 4,908,955 A | * | 3/1990 | Nicholson ..................... 33/808 |
| 5,054,207 A | | 10/1991 | Marshall |
| 5,306,031 A | | 4/1994 | Quinn et al. |
| 5,337,489 A | * | 8/1994 | Mustafa ........................ 33/832 |
| 5,490,092 A | | 2/1996 | Dale et al. |
| 5,813,132 A | * | 9/1998 | Bodkin, Sr. ................... 33/832 |
| 6,256,896 B1 | * | 7/2001 | Landauer ...................... 33/806 |

OTHER PUBLICATIONS

QuickCar Racing Products, Inc.,ad for QuickCar Ride Height Gauge Winder, GA (1999).
Intercomp Company ad for Digital Ride Height Gauge Minneapolis, MN (No Date).
AFCO Racing Products ad for Frame Height Tools, p. 111 (No Date).
Ad for Digital Ride Height Gauge (No Date).

* cited by examiner

*Primary Examiner*—Diego Gutierrez
*Assistant Examiner*—Madeline Gonzalez

(57) ABSTRACT

An improved frame height gauge for race cars includes a substantially hollow housing having an open top end. A spring urges a stop member pivotally mounted within the housing to an extended position in which the stop member projects through the top opening. In use, an individual slides the gauge beneath a frame portion of a race car at a location to be measured, causing the stop member to contact a portion of the race car frame, depressing the stop member against the bias of the spring into the housing to a depressed position in which the distance from a bottom surface of the housing resting on the ground or a floor to the uppermost extending portion of the stop member corresponds to the car frame height at the particular location. The stop member and housing include cooperating detent members operative to selectively retain and release the stop member from the depressed condition, allowing a user to remove the gauge from beneath the car, while still retaining an indication of the measured frame height on a scale inscribed or imprinted on the housing.

67 Claims, 11 Drawing Sheets

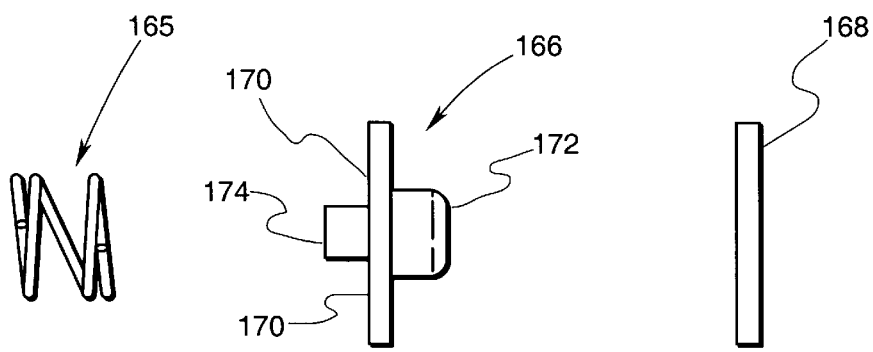
*Fig. 11A*  *Fig. 11B*
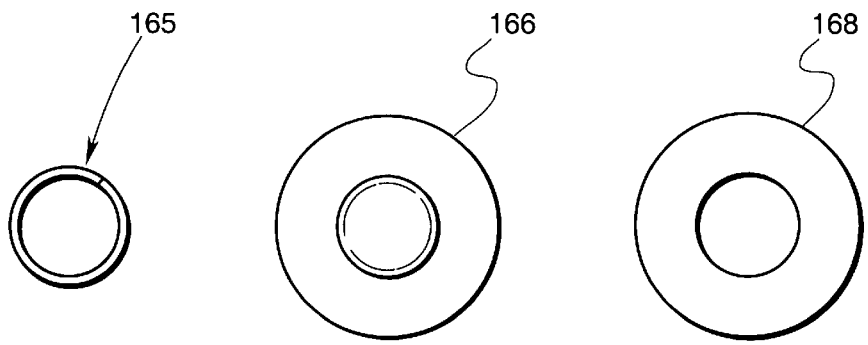
*Fig. 12*
*Fig. 13*
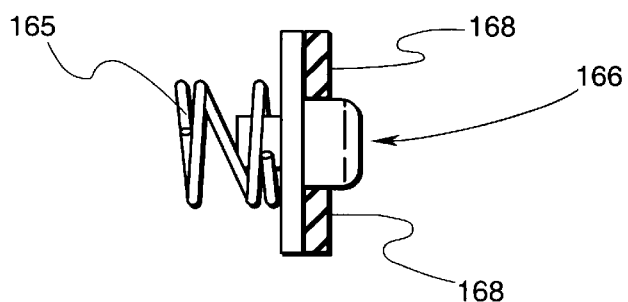
*Fig. 14*

GAUGE ESPECIALLY ADAPTED FOR MEASURING THE FRAME HEIGHT OF RACE CARS AND METHOD OF USING THE SAME

RELATED APPLICATIONS

The instant application is a continuation-in-part of Ser. No. 09/439,460, filed Nov. 15, 1999, the subject matter of which is incorporated herein by reference.

BACKGROUND OF THE INVENTION

1. Field of the Invention

The present invention relates to measuring gauges, and more particularly pertains to a gauge specifically adapted for measuring frame heights of race cars, for example so-called "stock cars" of the type that compete in NASCAR sanctioned events. The present invention also relates to a method of using the gauge.

2. Description of the Prior Art

In tuning or adjusting suspensions of such race cars to obtain desired frame heights and load distributions to comply with applicable regulations and to optimize performance of the cars for various tires and track conditions, race car mechanics have heretofore typically manually measured the frame height of the cars at various locations by lying on the ground and measuring with a ruler or tape measure. This procedure is time consuming, tedious, and introduces inaccuracies into the measurements.

The prior art also discloses various mechanical measuring gauges and implements that have been used to measure various vehicle frame, suspension, and body dimensions. For example, U.S. Pat. No. 5,054,207, the entire disclosure of which is incorporated herein by reference, issued to D. Ray Marshall on Oct. 8, 1991, discloses apparatus for measuring dimensions of a race car that employs a platform and a plurality of gauges for measuring various vehicle dimensions at various different locations on the vehicle. However, the device is very expensive, complicated to set up and maintain, and not easily transportable.

SUMMARY OF THE INVENTION

The present invention provides an improved frame height gauge for race cars comprising a substantially hollow housing having an open top end. A spring urges a stop member pivotally mounted within the housing to an extended position in which the stop member projects through said top opening. In use, an individual slides the gauge beneath a frame portion of a race car at a location to be measured, causing the stop member to contact a portion of the race car frame, depressing the stop member against the bias of the spring into the housing to a depressed position in which the distance from a bottom surface of the housing resting on the ground or a floor to the uppermost extending portion of the stop member corresponds to the car frame height at the particular location. The stop member and housing include cooperating detent members operative to selectively retain and release the stop member from the depressed condition, allowing a user to remove the gauge from beneath the car, while still retaining an indication of the measured frame height on a scale inscribed or imprinted on the housing.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIGS. 11a and 11b are a side elevational view and a front elevational view, respectively, of a torsional coil spring used in the gauge shown in FIG. 4.

FIG. 12 is an exploded side elevational view of the components of the push button release shown in FIG. 10.

FIG. 13 is a front elevational view of the push button release components shown in FIG. 12.

FIG. 14 is a side elevational view of the push button release shown in FIGS. 10, 12, and 13.

DETAILED DESCRIPTION OF THE PREFERRED EMBODIMENT(S)

Figure 1:
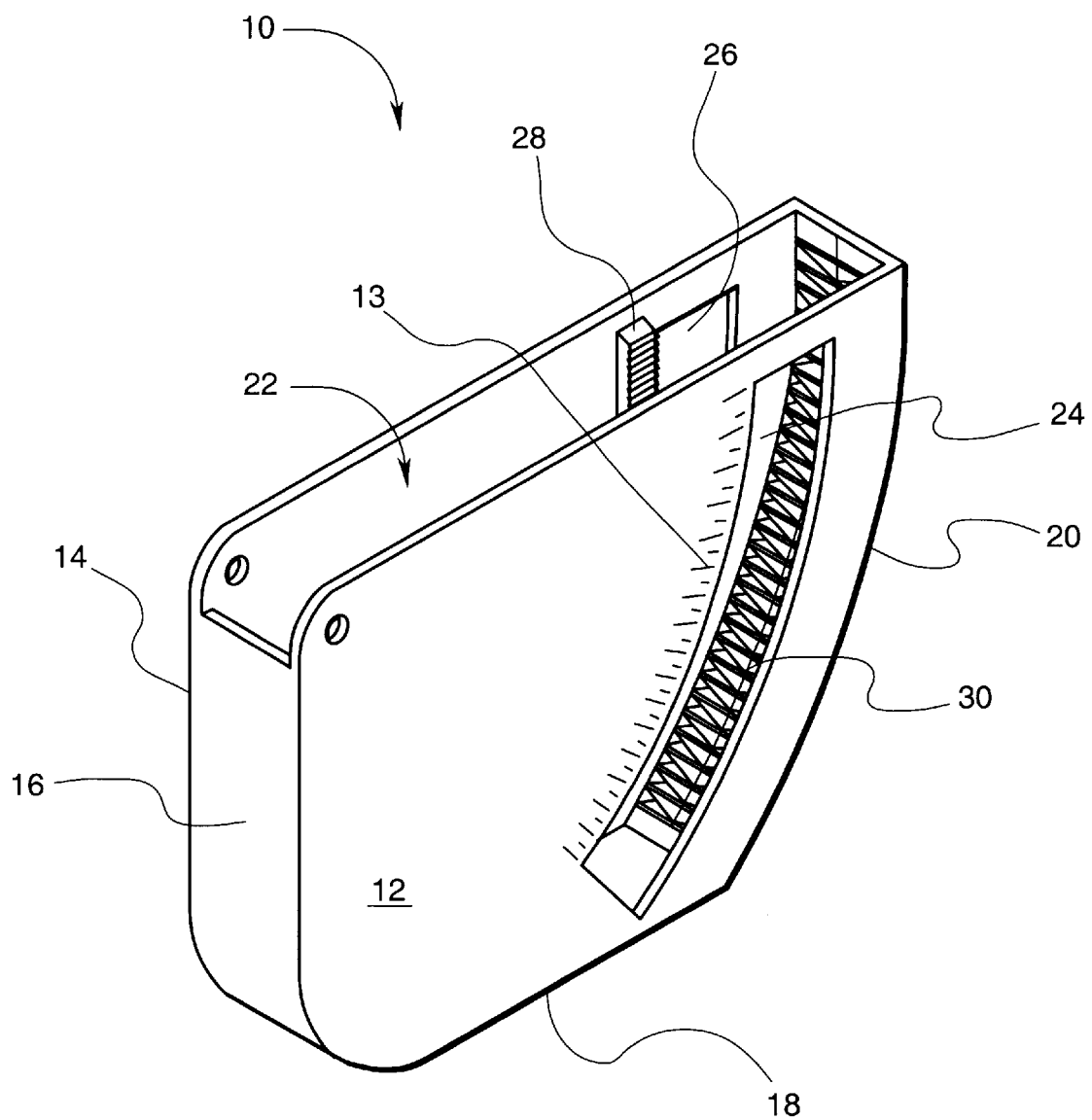
FIG. 1 is a perspective view of a housing portion of a frame height gauge according to the present invention.
Figure 2:
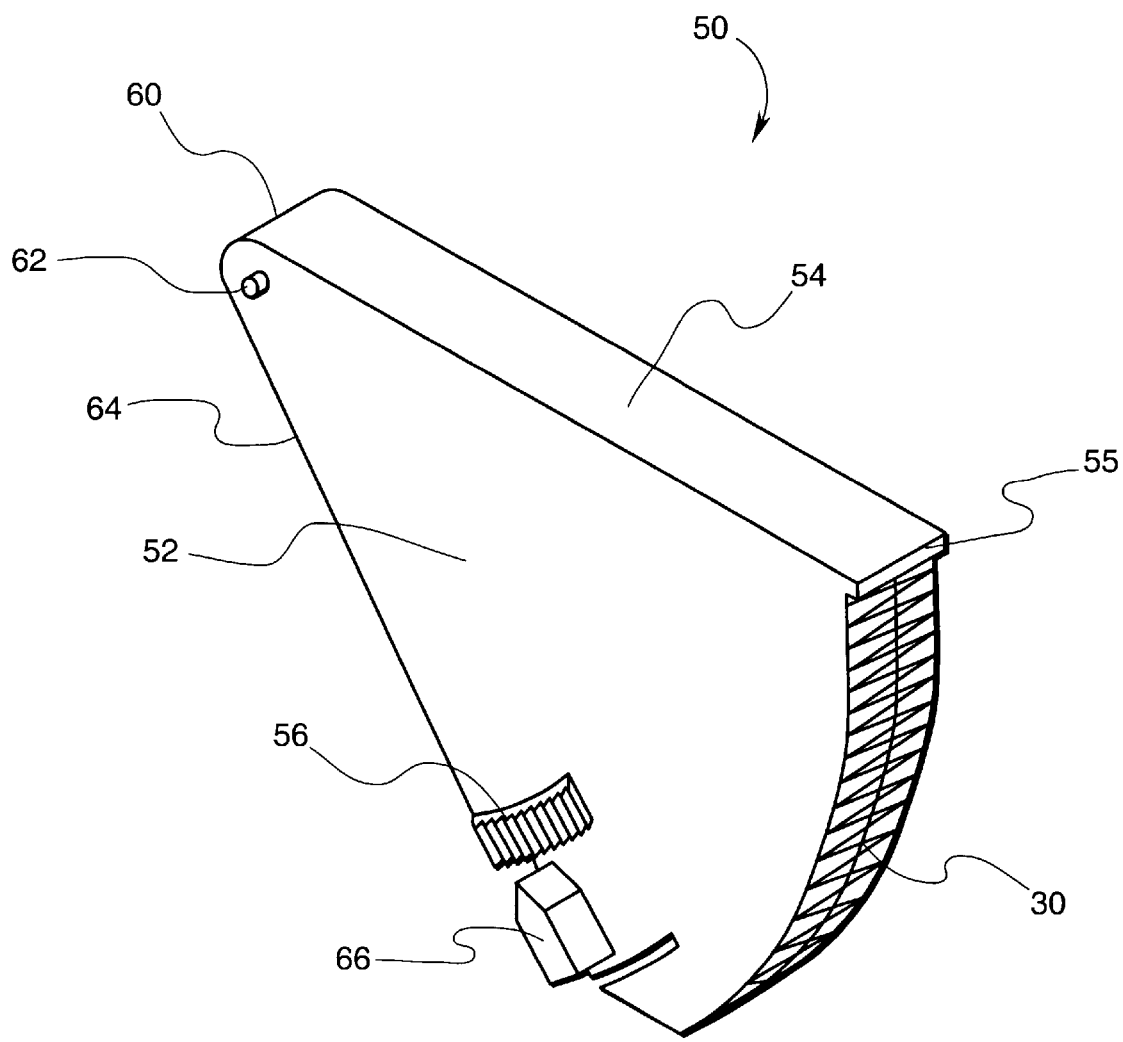
FIG. 2 is a perspective view of a stop member portion of a frame height gauge according to the present invention.
Figure 3:
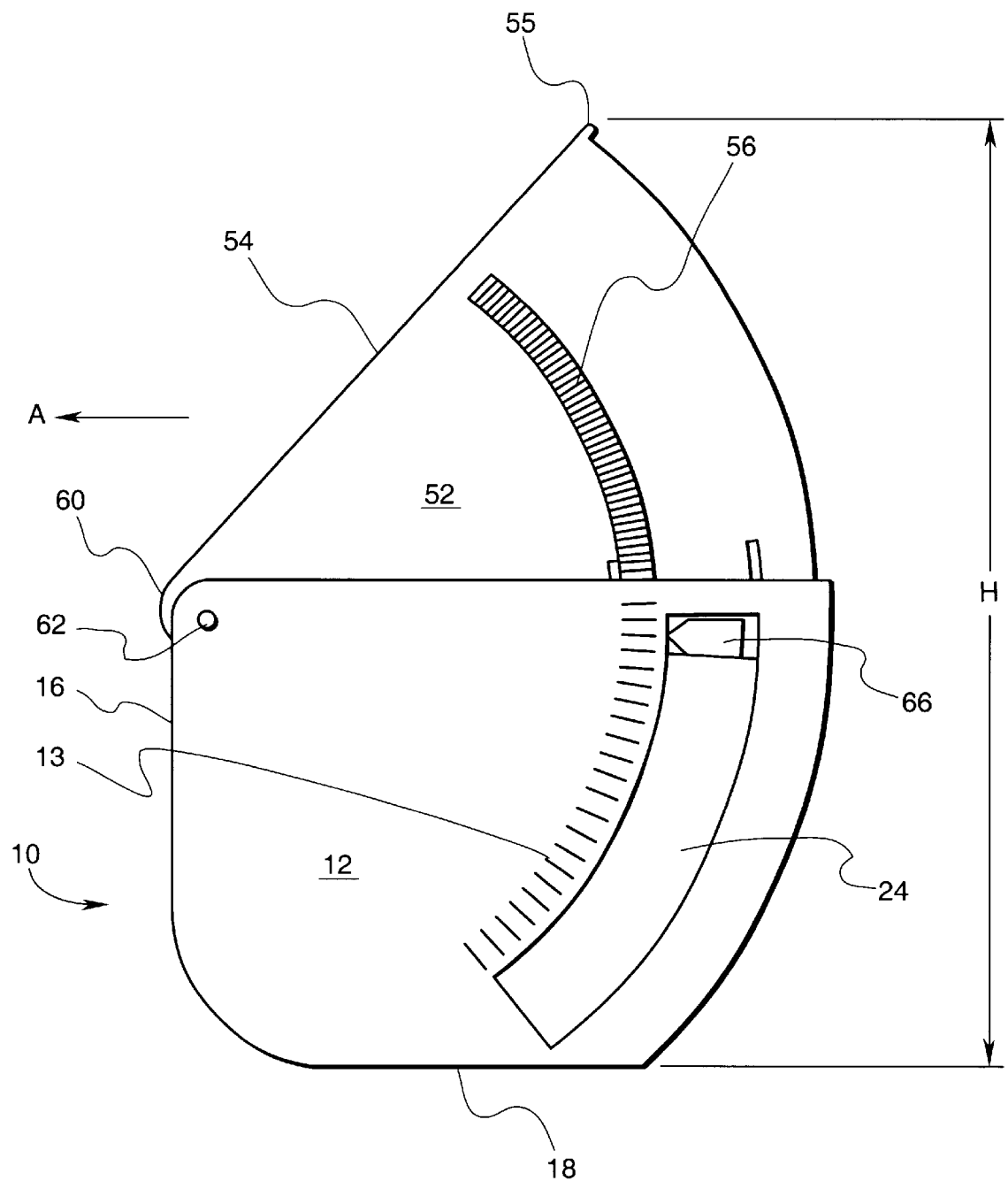
FIG. 3 is a side elevational view of a frame height gauge according to the present invention, disposed in an extended condition.

Referring now to the drawings, wherein like reference numerals designate corresponding structure throughout the views, and referring in particular to FIGS. 1 through 3, a frame height gauge according to an example preferred embodiment of the invention includes a generally rectangular, substantially hollow housing portion 10 formed by spaced, substantially parallel, planar side wall portions 12 and 14 connected by a rear wall 16, a bottom wall 18, and an arcuate front wall 20. The housing 10 includes an open upper end 22 communicating with the interior of the housing 10. A pair of juxtaposed arcuate slots or windows 24 and 26 are formed through the respective side walls 12 and 14, adjacent the front wall 20. A scale 13 is inscribed or imprinted on one or both of the sidewalls 12 and 14, adjacent one or both of the windows 24 and 26, to facilitate a visual determination of a particular race car frame height measurement, in a manner described hereinafter.

As best seen in FIG. 2, a substantially wedge or pie-shaped stop member 50 includes at least one substantially planar wedge or pie-shaped sidewall 52 connected transversely to a rectangular top wall 54 and a similar bottom wall 64. The walls 54 and 64 diverge angularly outwardly in a forward direction from an apex 60.

As may be appreciated from FIGS. 1 through 3, in an assembled condition of the frame height gauge, a pivot pin 62 pivotally mounts the stop member 50 for movement at least partially into and out of the housing 10 through the open upper end 22. In one aspect of the invention, a means is provided to bias the stop member 50 at least partially out of the housing 10, to the extended position shown in FIG. 3. The biasing means may take a variety of forms within the scope of the invention. For example, a coil spring 30 may be disposed between the interior bottom or floor 18 of the housing 10 and the top wall portion 54 of the stop member 50. Alternatively, in place of, or in addition to spring 30, a torsional coil spring (not shown) may be disposed around the pivot pin 62 within the housing 10, with opposite ends of the torsional coil spring, secured or abutting portions of the housing 10 and the stop member 50, thus providing the desired spring bias force.

Regardless of the selected design alternative, the salient function of the frame height gauge is as follows. First, a user inserts in the frame height gauge disposed in the extended condition shown in FIG. 3 in the direction indicated by arrow A under a desired portion of a race car frame to be measured. An uppermost portion 55 of the extended stop member 52 will contact the portion of the race car to be measured, with the bottom wall or floor 18 of the housing 10 positioned squarely on the surface of the ground, or on a floor. As the user continues to slide the gauge under the car until the portion 55 contacts the selected reference portion of the frame, the stop member 50 is forced downwardly, against the bias of the selected spring, at least partially through the open upper end 22 of the housing 10, and into the housing interior. A pair of arcuate teeth segments 28 (FIG. 1) disposed adjacent windows 24 and 26 on the interior surfaces of sidewalls 12 and 14 cooperate with complementary arcuate teeth segments 56 (FIG. 2) on the stop member 50. Instead of two pairs of complementary teeth segments, a single pair may be employed, or even a single segment or series of teeth and a cooperating lug. In place of the illustrated complementary teeth detent means illustrated, other detent mechanisms such as spring biased detent balls or pins and cooperating recesses or holes may be employed. The salient function of the detent means is to permit the stop member 50 to be selectively released and allowed to move to the extended position shown in FIG. 3, while still allowing the stop member 52 to be depressed back into the housing 10 to an extent sufficient to indicate a frame height measurement. The detent means also performs the function of retaining the measurement indication when the gauge is withdrawn from under the race car frame portion to allow convenient visual inspection of the measured value without the necessity of laying, kneeling, or crawling on the ground or floor. In addition, the manner of release of the particular selected detent mechanism may take a variety of forms. For example, release may be achieved by manually flexing or relative movement of the housing 10 and stop 50. Alternatively, manually released spring activated mechanisms may be employed.

In the example construction illustrated, the detent teeth 56 on the stop member 50 engage the complementary detent teeth 28 on the housing 10. An indicator or pointer 66 secured or formed on the stop member 50 is disposed in or through the window 24 of the housing 10 and cooperates with a scale 13 imprinted or inscribed on the housing 10 to provide a visual indication to a user of a measured dimension. The pointer 66 abuts the top edge of the window 24 in the fully extended position shown in FIG. 3, thus serving as a limit stop to prevent complete disengagement of the stop 50 from the housing 10. Although a single pointer 66 is shown, it should be understood that two such pointers are preferably provided, one copying with each of the respective windows 24 and 26. In this construction, a user may release the detent teeth 56 from engagement with the complementary cooperating detent teeth 28 to allow retraction of the stop member 50 by slightly squeezing the pointers 66 together, thus temporarily compressing the width of the stop member 50.

Preferably, the dimensions of the various components are selected such that in the maximum extended position of the stop member 50 shown in FIG. 3 corresponds to a measured frame height H of about 6 and ⅜ inches, although other dimensions may be employed. A gauge 10 of the preferred size is small enough so as to be easily transported in a pocket or tool kit.

Figure 4:
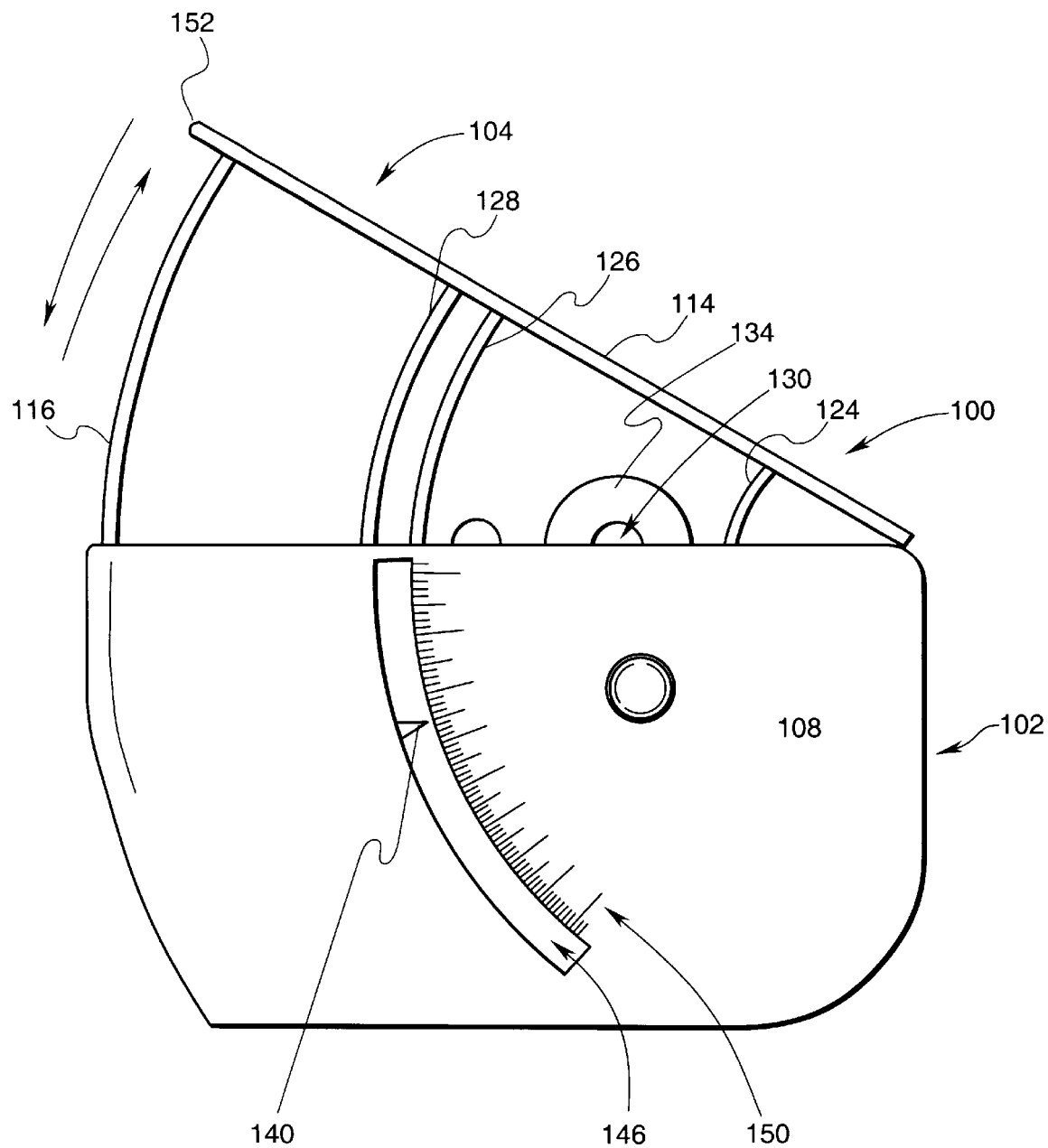
FIG. 4 is a side elevational view of a gauge according to a second embodiment of the present invention, disposed in an extended condition.
Figure 5:
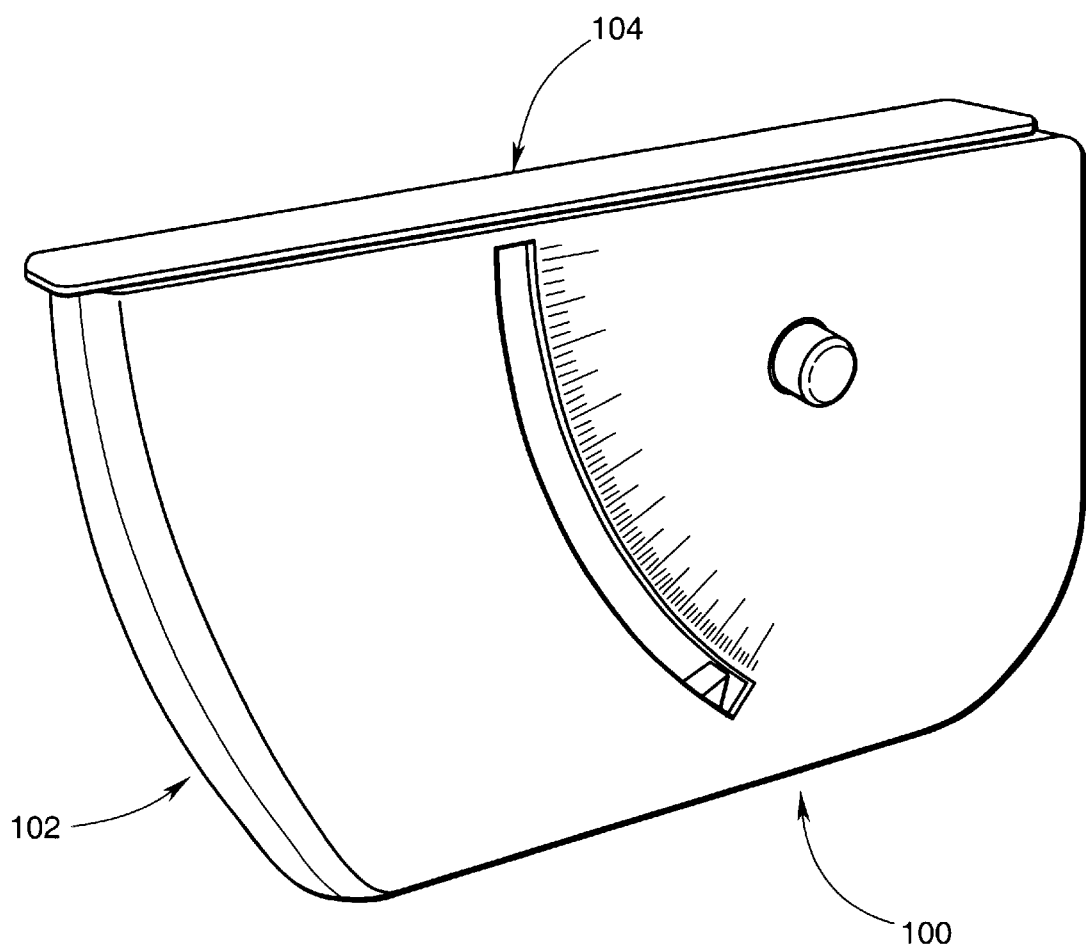
FIG. 5 is a perspective view of the gauge shown in FIG. 4 in a non-extended position.
Figure 6:
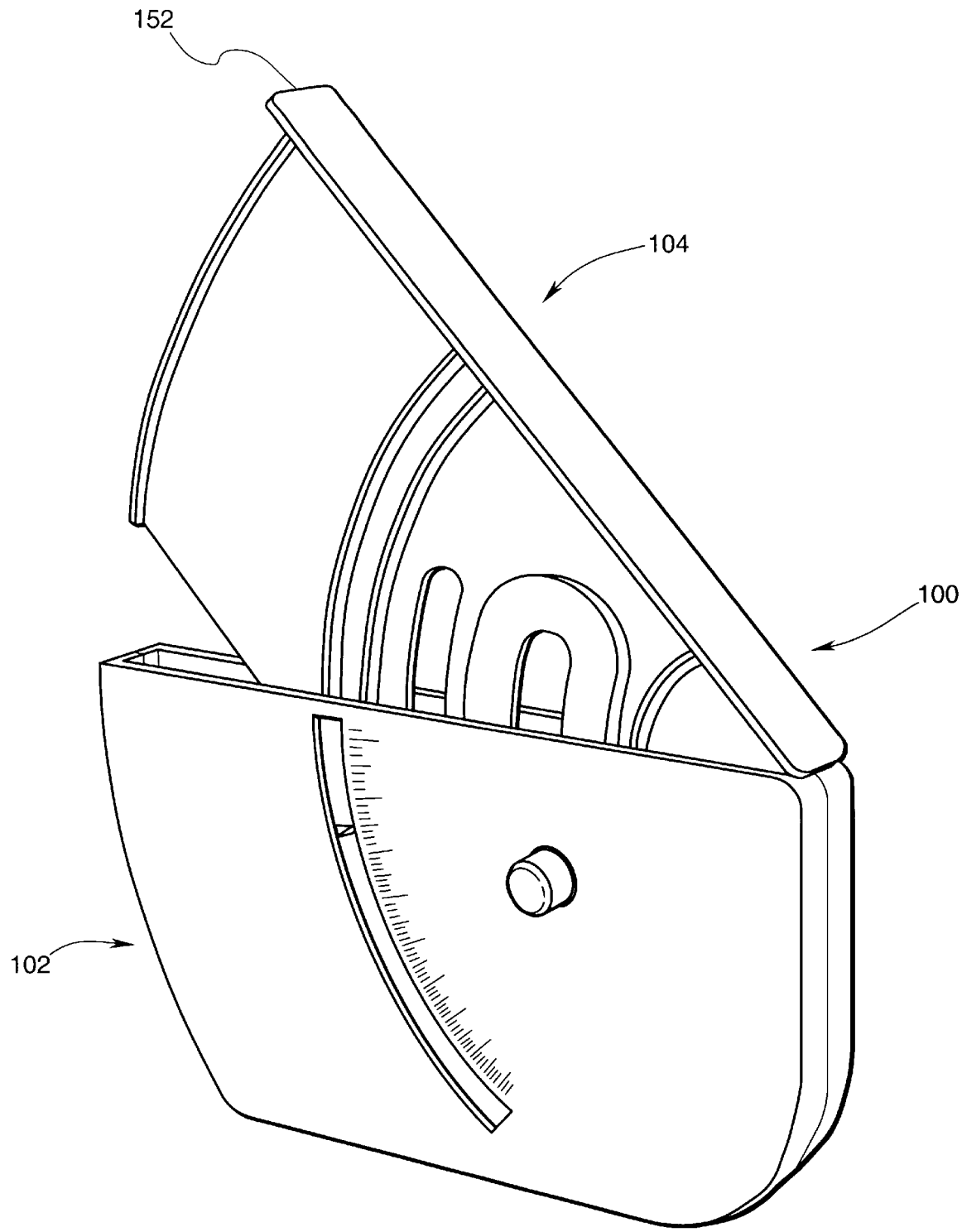
FIG. 6 is a perspective view of the gauge shown in FIG. 5, disposed in an extended condition.

There is shown in FIGS. 4, 5 and 6 a gauge 100 in accordance with a second preferred embodiment of the present invention, generally comprising a casing or housing 102 and a stop 104 as best shown in FIGS. 5, 6, 7a, 7b, 8a, and 8b. The housing 102 is preferably fashioned of two substantially similar pieces 106, 108 each of which possesses a protruding lip 110, 112 respectively, extending from the peripheral edge thereof along each of the lateral sides and the bottom, lower side. The piece 106 is adapted to abut along its lip 110 with the lip 112 of the piece 108. The two pieces 106, 108 may be secured in such an abutting relationship by means of an adhesive, sonic welding, tape, a snap-fit connection, or the like. It should be appreciated that when the two pieces 106, 108 are so secured together, the housing 102 is substantially hollow, like a pocket, with an open upper side.

The stop 104 generally comprises a sheet of material having a configuration that preferably corresponds with the internal dimensions of the housing 102, as best shown in FIGS. 4, 6, 9, and 10. The stop 104 includes a flattened top edge 114 that is adapted to extend along the entire length of the upper, open side of the housing 102. The stop 104 also includes a flattened lateral edge 116 along a lateral side thereof, which is adapted to be slidingly juxtaposed against the lips 110, 112 extending along one lateral side of the housing 102.

Figure 7A:
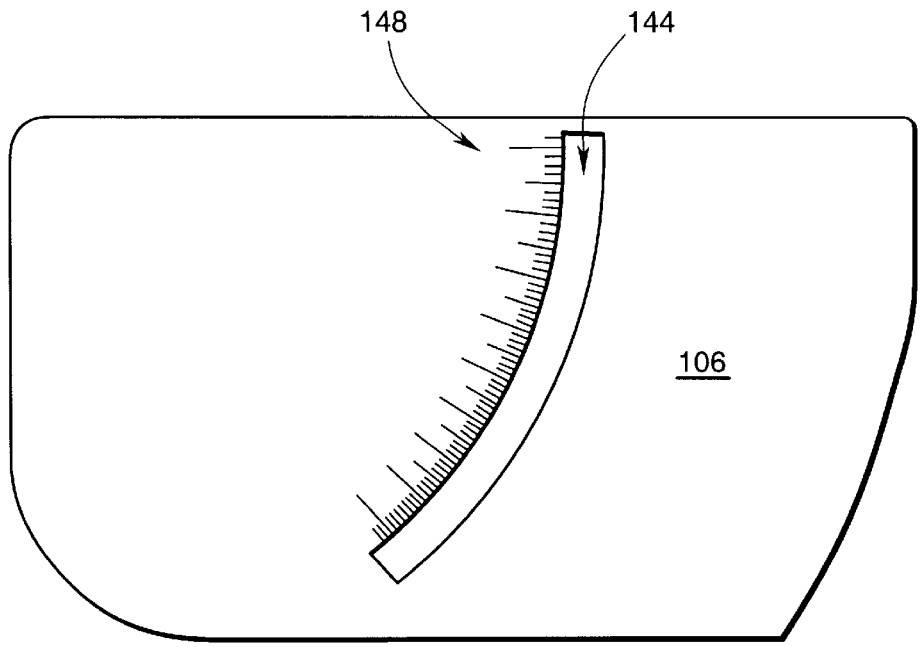
FIGS. 7a and 7b are side elevational views of the outside surface and the inside surface, respectively, of one portion of a housing of the gauge shown in FIG. 4.
Figure 7B:
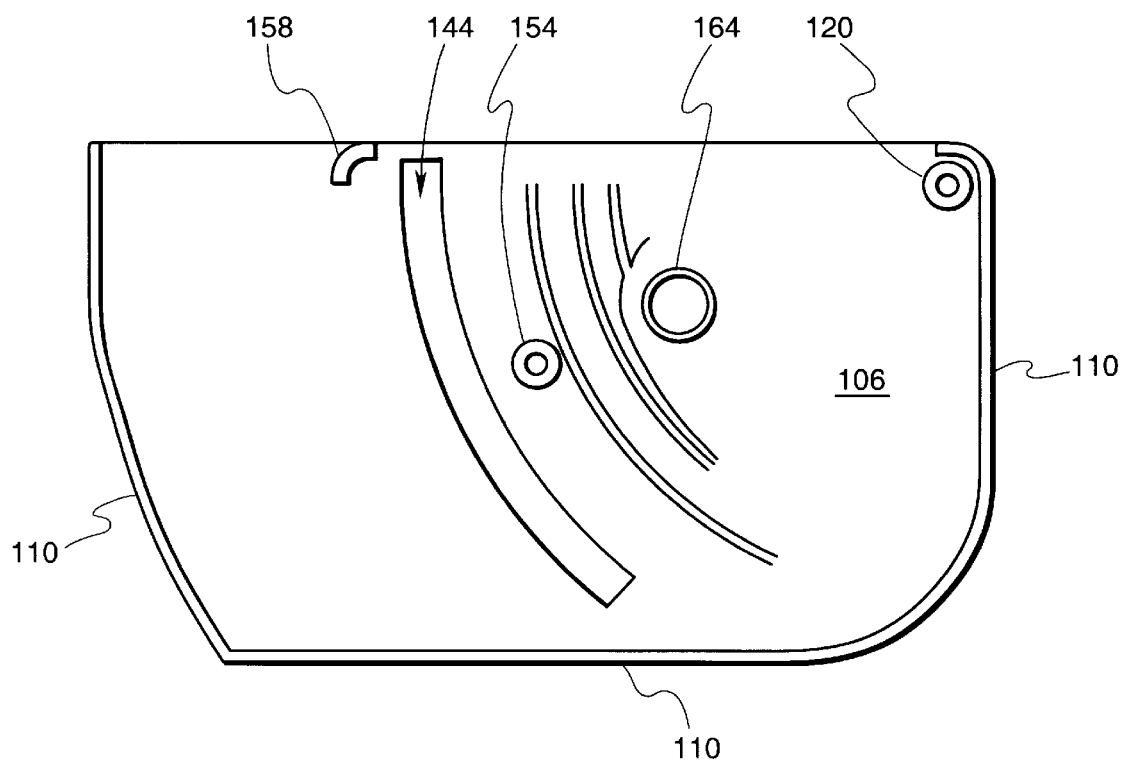
Figure 8A:
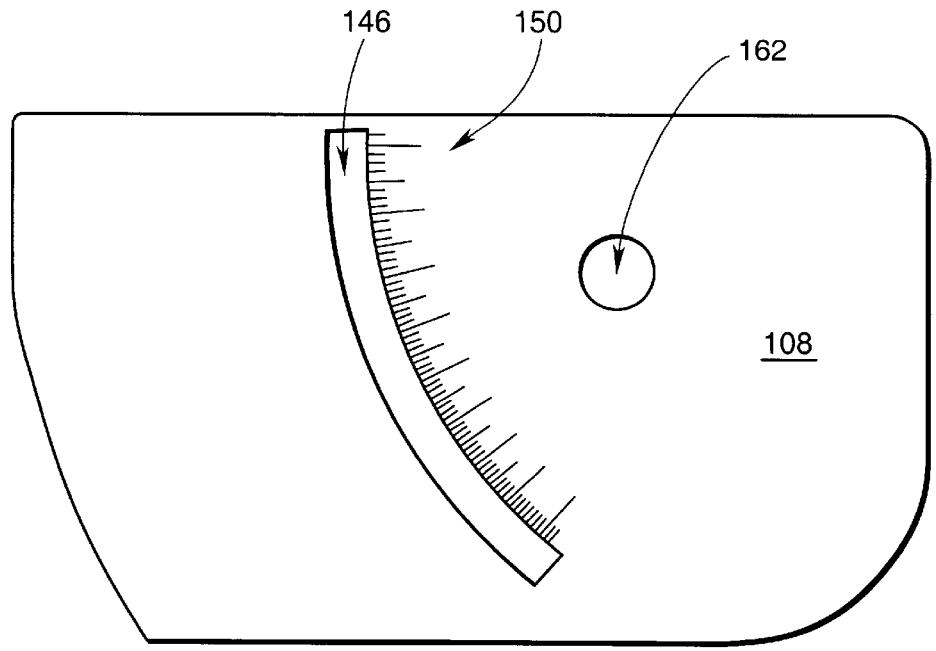
FIGS. 8a and 8b are side elevational views of the outside surface and the inside surface, respectively, of another portion of the housing of the gauge shown in FIG. 4.
Figure 8B:
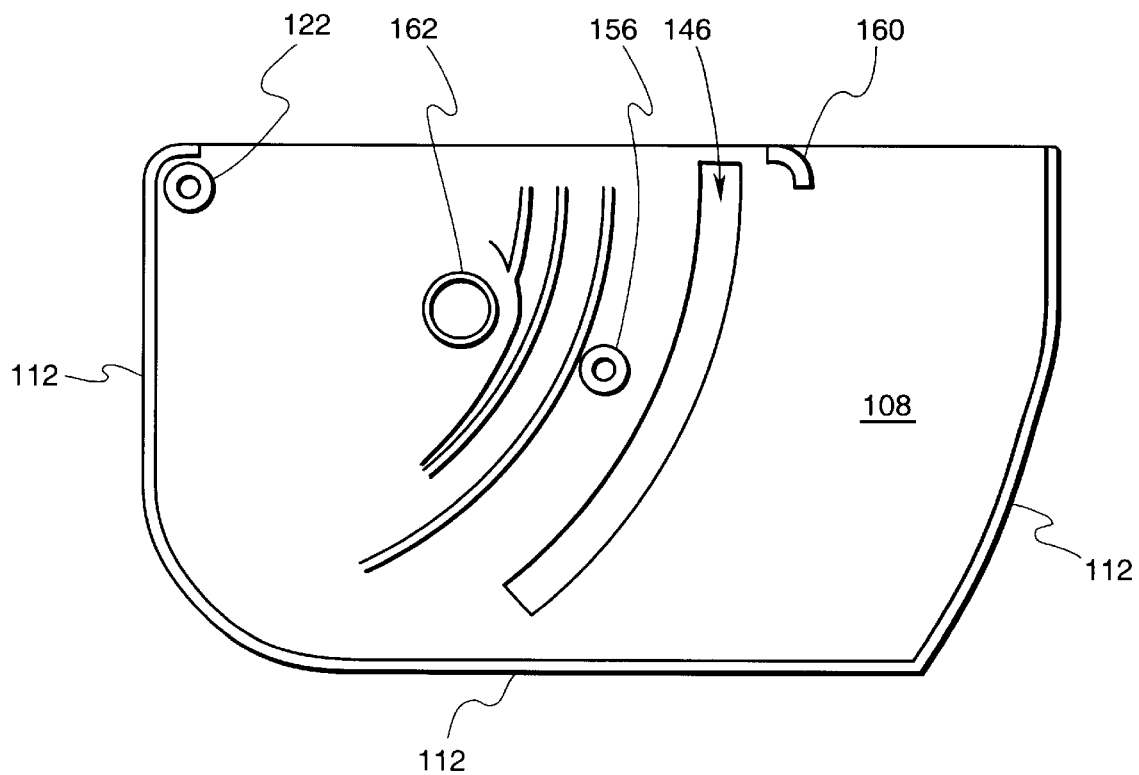

Each side of the stop 104 is provided with a pivot pin 118 near the junction of the flattened top edge 114 and the lateral side opposite the flattened lateral edge 116. Each pivot pin 118 is adapted to be rotatably received in a corresponding circular ring 120, 122 juxtaposed on an interior surface of the housing portions 106, 108, respectively, as best shown in FIGS. 7b and 8b. As such, the stop 104 may rotate with respect to the housing 102 from a closed or a retracted position as shown in FIG. 5 to an upward, extreme extended position, as shown in FIG. 6.

The stop 104 also includes a plurality of guide and strengthening ribs 124, 126, 128 on each side thereof arcuately arranged with respect to the pivot pin 118. The ribs 124, 126, 128 extend from the flattened top edge 114 radially about the pivot pins 118 to another edge of the stop 104. The stop 104 also includes a pair of slots 130, 132 each arcuately extending about the pivot pins 118 from the edge of the stop 104 opposite to the flattened lateral edge 116. The arcuate slots 130, 132 extend only approximately two-thirds of the distance from the edge toward the flattened top edge 114. The region 134 around the arcuate slot 130 may be depressed to receive a push button release mechanism, as will be more fully explained below.

The stop 104 may be biased toward an extreme extended position through utilization of a pair of torsional coil springs 136 as best shown in FIGS. 1*a* and 1*b*. Each spring 136 includes a central coiled section and two ends oppositely extending therefrom. A spring 136 is mounted on each of the pivot pins 118, by extending the associated pivot pin 118 through the central aperture of the coil portion of the spring 136. One leg of each spring 136 is then abutting the position against one of the lips 110, 112, and the other leg is squeezed against a lug 138 extending from the stop 104 at a location slightly below each pivot pin 118. In such a position, the legs of the spring 136 are compressed between the lips 110, 112 and the lugs 138, which tends to push the lugs 138 and thereby the entire stop 104 rotationally about the pivot pins 118 toward an extreme extended position, as shown in FIG. 6.

Figure 9:
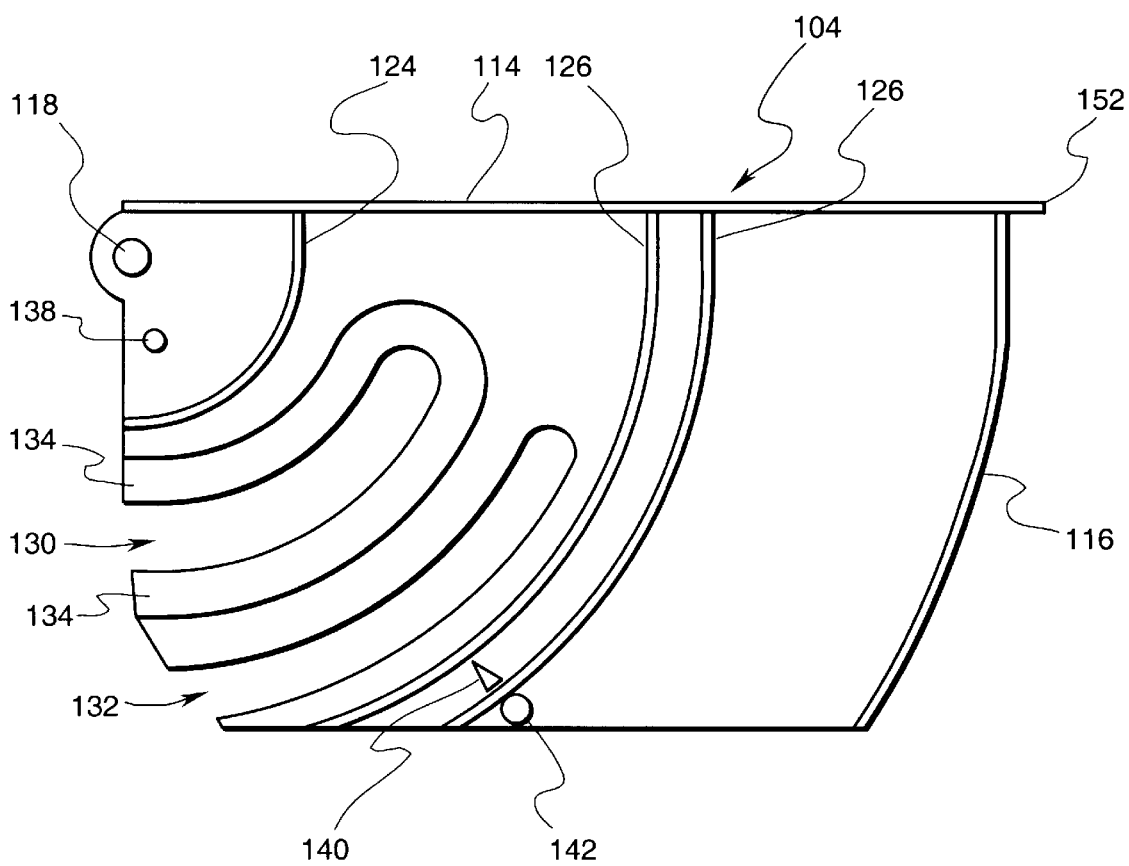
FIG. 9 is a side elevational view of a stop in the gauge shown in FIG. 4.
Figure 10:
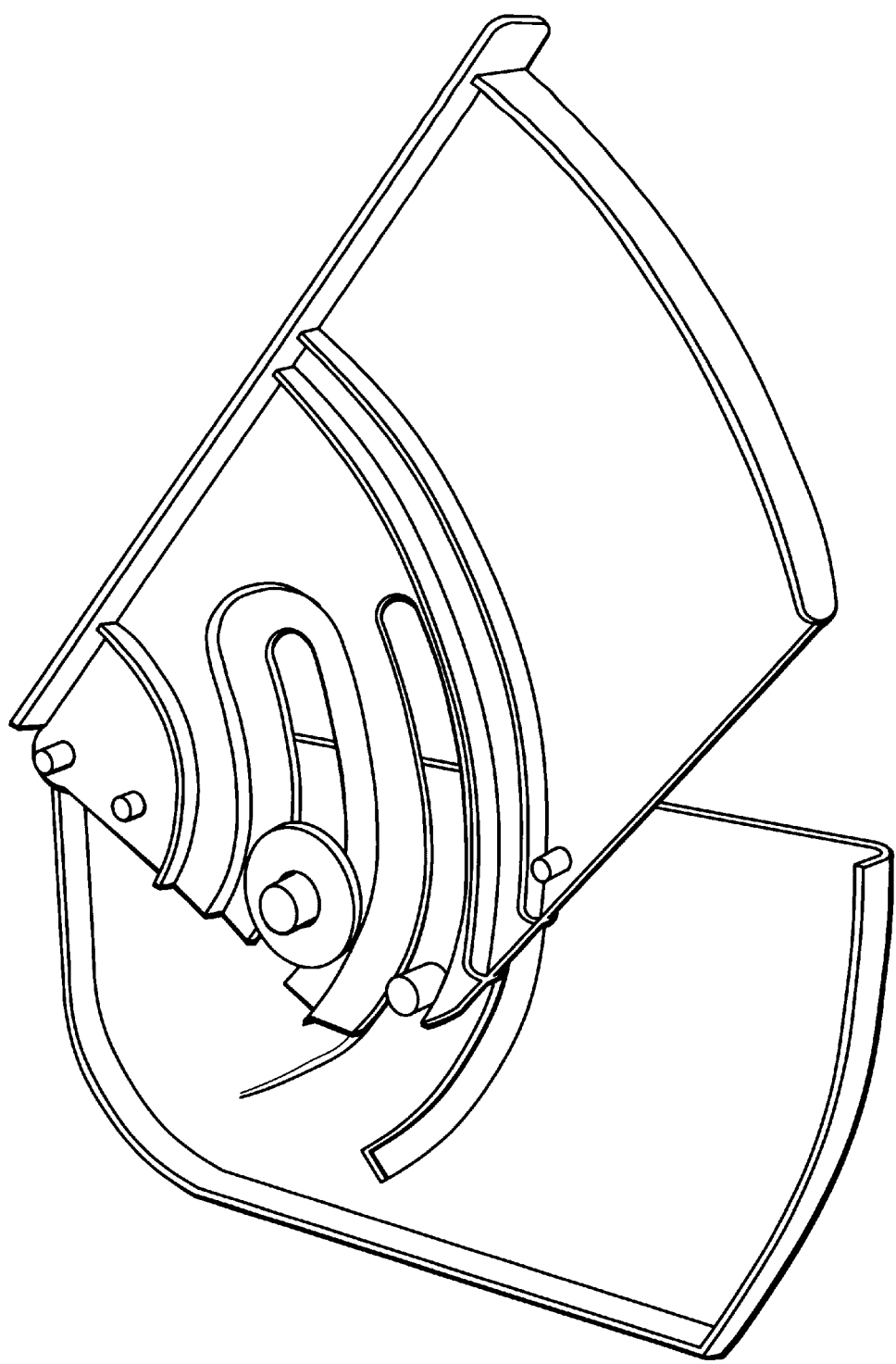
FIG. 10 is a perspective view of a stop shown in FIG. 9 and the housing portion shown in FIGS. 8a and 8b along with a push button release utilized in the gauge shown in FIG. 4.

Each side of the stop 104 also possesses a triangularly shaped pointer 140 disposed between the ribs 126, 128. Preferably the pointer 140 is colored to contrast with the other portions of the housing 102 and the stop 104. The stop 104 also includes a pair of limit pins 142 extending from each side of the stop 104 near the rib 128, toward the lower edge of the stop 104, as best shown in FIG. 9.

Each of the housing portions 106, 108 includes a window 144, 146 that arcuately extends radially about the rings 120, 122 and the pivot pins 118 from a location slightly below the top side of each portion 106, 108 to a location near the lower side of each portion 106, 108. The outside surface of each housing portion 106, 108 also includes a scale 148, 150 located along the inside periphery of each associated window 144, 146 respectively. Preferably the scale 148, 150 indicates inches and portions of inches ranging from about three inches to eight inches. In a manner described more completely below, the inches indicate the height of the distal end 152 of the flattened top edge 114 of the stop 104 above the lower side of the housing 102.

It will be appreciated that when the stop 104 is mounted within the housing 102 such that the pivot pins 118 extend into corresponding rings 120, 122 and when the stop 104 is pivoted with respect to the pivot pins 118, the pointers 140 may be viewed through each of the windows 144, 146, as best shown in FIGS. 4 and 5. The position of the pointers 140 in the windows 146, 148 thus corresponds with the arcuate extension of the stop 104 with respect to the housing 102. Through geometry, the relative height of the distal end 152 of the flattened top side 114 of the stop 104 above the top edge of the housing 102 may be calculated. Since the length of the distal end 152 from the pivot pins 118 is fixed and known, since the sine of the angle of arcuate extension of the stop 104 is equal to the height of the distal end 152 above the top side of the housing 102 divided by the length of the distal end 152 from the pivot point, and since the distance from the lower surface of the housing 102 to the top side of the housing 102 is fixed and known, the overall height of the distal end 152 above the lower side of the housing 102 may be calculated. Because the pointers 140 indicate the angle of rotation of the stop 104, the scales 148, 150 may calibrated in inches, which corresponds to the height of the distal end 152 above the lower side of the housing 102. The position of the pointers 140 relative to the scales 148, 150 indicates the number of inches of such height.

Preferably the stop 104 pivots through a range of about forty-five to seventy degrees and preferably the height measurable by the gauge is about three to eight inches.

One of the housing portions 106 possesses a circular female member 154 extending generally, centrally from the interior side thereof, as best shown in FIG. 7*b*. A male member 156 protrudes from the interior surface of the other housing portion 108 at a location where the members 154, 156 mate when the two housing portions 106, 108 are placed together. The members 154, 156 may be snap fit members. The members 154, 156 help provide stability to the housing 102. It should be appreciated that the members 154, 156 slidably extend through the arcuate slot 132 in the stop 104.

Each of the housing portions 106, 108 also possesses a curved abutment 158, 160, respectively, protruding from the inner surface thereof in the region adjacent the upper end of the associated window 144, 146. The curved abutments 158, 160 do not extend in contact with each other when the two housing portions 106, 108 are secured together. Rather, the stop 104 slides between the two abutments 158, 160. It will be appreciated that the limit pins 142 will abut an associated one of the curved abutments 158, 160 as the stop 104 is rotated upwardly and that the contact of the limit pins 142 with the curved abutments 158, 160 prevents the stop 104 from further upward extension with respect to the housing 102.

One of the housing portions 108 includes a circular aperture 162 extending therethrough. The other housing portion 106 includes a ring 164 protruding from the inner surface thereof at a location opposite to the aperture 162 when the two housing portions 106, 108 are secured together. The aperture 162 and the ring 164 are adapted to cooperate with a push button release mechanism that includes a coil compression spring 165, a plunger 166, and a washer 168, as best shown in FIGS. 12, 13, and 14. The plunger 166 includes a central circular plate 170, a relatively large cylindrical button 172 centrally disposed on the plate 170 on one side thereof, and a cylindrical alignment pin 174 protruding centrally from plate 170 on the opposite side thereof, as best shown in FIG. 12. The washer 168 preferably possesses a surface of sandpaper or other abrasive material, or another material having a relatively high coefficient of friction.

The coil spring 165 is adapted to circumscribe the ring 164 and alignment pin 174. The alignment pin 174 is adapted to extend into the interior of the ring 164, and the button 172 is adapted to extend through the aperture 162. The washer 168 is adapted to rest within the depressed region 134 surrounding the arcuate slot 130. It will be appreciated that the button 172 also extends through the arcuate slot 130.

The operation of the push button release will now be explained. When the button 172 is not depressed against the bias of coil compression spring 164, the washer 168 forcefully and intimately engages the depression 134 surrounding the arcuate slot 130, thereby providing a frictional engagement of the washer 168 against the stop 104. The frictional engagement is sufficient to resist rotation of the stop 104 relative the housing 102, despite the biasing force created by the pair of torsional coil springs 136. By manually depressing the button 172 against the compression force of coil spring 164, the washer 168 will become either disengaged from or only loosely engaged with the depressed region 134 surrounding the arcuate slot 130. When the button 172 is depressed, the stop 104 moves in response to the bias of the torsional coil springs 136 to an outward extended position, which is limited by contact of the limit pins 142 against the curved abutments 158, 160.

The operation of the gauge will now be described with reference to measuring the height of a car frame above a floor on which the car rests. It should be appreciated that the gauge may be utilized for a wide variety of other measurements. There are two similar modes of utilizing the gauge. In one mode, the gauge 100 is placed in an upright position with the lower side of the housing 102 resting flush upon the floor, beneath the portion of the frame, the distance of which above the floor, which is to be measured. The button 172 is manually depressed, which permits the stop 142 to rotate upwardly in response to the bias of the springs 136 such that the distal end 152 of the stop 104 contacts the frame. The button 172 is then released, which causes the washer 168 to forcefully, frictionally engage the depression 134 surrounding the arcuate slot 130, which inhibits rotation of the stop 104 relative to the housing 102. The gauge 100 is then withdrawn from beneath the car and the pointer 140 indicates on the scale 148, 150 the number of inches above the floor of the location of the frame contacted by distal end 152. In a second, similar mode, the button 172 is manually depressed so that the stop 104 is released to a full extension in response to the bias of the springs 136, as limited by contact of the limit pins 142 with the curved abutments 158, 160. The manual button 172 is then released so that the washer 168 frictionally engages the depression 134 surrounding the arcuate slot 130, which inhibits rotation of the stop 104 relative the housing 102. The gauge 100 is then slid into a position beneath the frame such that the lower side of the housing 102 lies flush on the floor and the housing 102 is oriented in an upright position. As the gauge 100 is slid beneath the frame, the frame will contact the flattened top edge 114 of the stop 104 and will depress the stop 104 against both the bias of the springs 136 and the frictional engagement of the washer 168 with the depression 134. When the distal end 154 of the stop 104 contacts the frame, then the gauge 100 is removed from beneath the car and the pointer 140 is again used to indicate, by means of scales 148,150, the height of the frame above the floor.

It should be appreciated that the gauge 100 may include only a single window, a single pointer, and a single scale.

The various components of the present invention may be formed from a variety of different materials such as plastic or sheet metal, using myriad conventional fabrication techniques.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts or types of material within the principles of the invention to the full extent indicated by the broad general meaning of the terms in which the appended claims are expressed.

What is claimed is:

1. A frame height gauge adapted for measuring the vertical distance between a substantially planar surface upon which a vehicle is resting and a frame or other portion of the carriage of the vehicle, comprising:

a housing including at least one opening and adapted to rest upon said surface;

a stop member disposed at least partially within said housing and mounted for movement at least partially within said housing through said opening to a range of positions extending out from said housing such that when said housing rests upon said surface, said stop member may extend out of said housing to an abutment position whereby said stop member abuts said carriage portion of said vehicle, and whereby said abutment position provides a measurement of said vertical distance;

means biasing said stop member for movement out of said housing; and detent means for retaining said stop member in said abutment position.

2. The gauge of claim 1, wherein said means biasing said stop member comprises a spring.

3. The gauge of claim 2, wherein said spring comprises a coil spring having a first end abutting a portion of said housing and a second end abutting said stop member.

4. The gauge of claim 2, wherein said spring comprises a torsional spring having a first end abutting a portion of said housing and a second end abutting said stop member.

5. The gauge of claim 1, wherein said stop member is pivotally mounted to said housing.

6. The gauge of claim 1, wherein said detent means comprises a plurality of teeth mounted on either said housing or said stop member and at least one lug disposed for engagement with said teeth.

7. The gauge of claim 6, further comprising a measuring scale on said housing.

8. A measuring gauge, comprising:

a housing formed by substantially parallel sidewalls connected by front and rear walls and also by a bottom wall, said housing having a substantially open top portion;

a stop mounted for pivotal movement at least partially into and out of said housing through said open top portion;

means for biasing said stop in a direction out of said housing toward an extended position;

at least one detent member for selectively retaining said stop in a fixed position relative to said housing and selectively permitting extension of said stop in a direction out of said housing through said open top portion in response to said biasing means.

9. The measuring gauge of claim 8, wherein said stop is pivotably extensible out of said open top portion at least about forty-five degrees.

10. The measuring gauge of claim 8, wherein said housing includes at least one window, and said measuring gauge further comprises a pointer disposed for sliding movement in said window concurrently with pivotal movement of said stop.

11. The measuring gauge of claim 8, wherein said detent member comprises a plurality of complementary selectively engagable teeth on said housing and on said stop member.

12. The measuring gauge of claim 8, wherein said stop member is disposed substantially entirely within said housing in a non-extended, fully retracted position.

13. The measuring gauge of claim 8, wherein at least one of said housing and said stop member is selectively deformable to release said detent member.

14. A measuring gauge, comprising:

a housing formed by a pair of substantially planar sidewalls disposed in substantially parallel relation, said sidewalls connected by a rear wall, an arcuate front wall, a bottom wall, and said housing having a substantially open top portion;

a substantially wedge-shaped stop member including a narrow apex portion pivotally mounted by a pivot pin mounted adjacent to the intersection of said sidewalls and said rear wall of said housing, said stop member mounted for movement at least partially into and out of said open top portion of said housing;

cooperating detent members on said housing and on said stop member for selectively retaining said stop member and said housing in a selected adjusted relative position, said detent members allowing selective release of said stop member to permit said stop member to move into and out of said housing through said open top portion of said housing;

at least one arcuate window formed through at least one of said sidewalls of said housing;

at least one pointer connected to said stop member and disposed in engagement with said window for sliding movement therealong; and a scale on said housing adjacent said window, said scale cooperating with said pointer to provide a visual indication to a user of a measurement.

15. The measuring gauge of claim 14, further comprising a spring biasing said stop member through said top opening in a direction away from said housing.

16. The measuring gauge of claim 14, wherein said spring comprises a coil compression spring.

17. The measuring gauge of claim 14, wherein said spring comprises a torsional coil spring.

18. The gauge adapted for measuring the vertical distance between a substantially planar surface upon which a vehicle is mounted and a frame or other portion of the carriage of the vehicle, said gauge comprising:

a housing possessing a lower surface adapted to rest upon said substantially planar surface;

a stop mounted to said housing and moveable extensibly upwardly from said housing, away from said lower surface;

means for biasing said stop toward an extensibly upward position; and means for selectively inhibiting extensible movement of said stop, whereby when said lower surface of said housing rests upon said substantially planar surface and said stop abuts said frame or other portion of said carriage of said vehicle, the amount of upward extension of said stop measures said vertical distance.

19. The gauge of claim 18 wherein said stop is pivotably moveable from a retracted position wherein said stop is disposed substantially entirely within said housing through a range of about forty-five to seventy degrees to an upwardly extended position.

20. The gauge of claim 18 wherein said biasing means comprises a spring.

21. The gauge of claim 18 wherein said inhibiting means comprises a plate adapted for frictional engagement with said stop and means for selectively compressing said plate against said stop.

22. The gauge according to claim 19 wherein said inhibiting means comprises a plate adapted for frictional engagement with said stop and means for selectively compressing said plate against said stop.

23. The gauge according to claim 18 wherein said housing includes at least one substantially arcuate window and wherein said stop includes a pointer protruding into said window and connected to said stop for concurrent pivoted movement with said stop.

24. The gauge according to claim 19 wherein said housing includes at least one substantially arcuate window and wherein said stop includes a pointer protruding into said window and connected to said stop for concurrent pivoted movement with said stop.

25. The gauge according to claim 18 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

26. The gauge according to claim 19 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

27. The gauge according to claim 23 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

28. The gauge according to claim 18 wherein said gauge is capable of measuring said vertical distance only in the range of about three inches to eight inches.

29. The gauge according to claim 19 wherein said gauge is capable of measuring said vertical distance only in the range of about three inches to eight inches.

30. The gauge according to claim 27 wherein said gauge is capable of measuring said vertical distance only in the range of about three inches to eight inches.

31. A gauge adapted for measuring the vertical distance between a substantially planar surface upon which a vehicle is mounted and a frame or other portion of the carriage of the vehicle, said gauge consisting essentially of:

a housing possessing a lower surface adapted to rest upon said substantially planar surface;

a stop mounted to said housing and moveable extensibly upwardly from said housing, away from said lower surface;

means for biasing said stop toward an extensibly upward position; and means for selectively inhibiting extensible movement of said stop, whereby when said lower surface of said housing rests upon said substantially planar surface and said stop abuts said frame or other portion of said carriage of said vehicle, the amount of upward extension of said stop measures said distance.

32. The gauge of claim 31 wherein said stop is pivotably moveable from a retracted position wherein said stop is disposed substantially entirely within said housing through a range of about forty-five to seventy degrees to an upwardly extended position.

33. The gauge of claim 31 wherein said biasing means comprises a spring.

34. The gauge of claim 31 wherein said inhibiting means comprises a plate adapted for frictional engagement with said stop and means for selectively compressing said plate against said stop.

35. The gauge according to claim 32 wherein said inhibiting means comprises a plate adapted for frictional engagement with said stop and means for selectively compressing said plate against said stop.

36. The gauge according to claim 31 wherein said housing includes at least one substantially arcuate window and wherein said stop includes a pointer protruding into said window and connected to said stop for concurrent pivoted movement with said stop.

37. The gauge according to claim 32 wherein said housing includes at least one substantially arcuate window and wherein said stop includes a pointer protruding into said window and connected to said stop for concurrent pivoted movement with said stop.

38. The gauge according to claim 31 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

39. The gauge according to claim 32 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

40. The gauge according to claim 36 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

41. The gauge according to claim 31 wherein said gauge is capable of measuring said vertical distance only in the range of about three inches to eight inches.

42. The gauge according to claim 32 wherein said gauge is capable of measuring said vertical distance only in the range of about three inches to eight inches.

43. The gauge according to claim 40 wherein said gauge is capable of measuring said vertical distance only in the range of about three inches to eight inches.

44. A gauge for measuring a distance between a first surface and a second surface, comprising:
   a housing possessing a first housing surface adapted to abut against said first surface;
   a stop mounted on said housing and moveable extensibly away from or toward said first housing surface, said stop having a limited range of movement between a retracted position closest to said first housing surface and an extreme extended position farthest from said first housing surface;
   means for biasing said stop member toward said extreme extended position; and
   means for selectively inhibiting movement of said stop, whereby when said first housing surface abuts against said first surface and when said stop abuts said second surface, the amount of extension of said stop within said range measures said distance.

45. The gauge of claim 44 wherein said stop is pivotably mounted on said housing and pivotably moves extensible away from or toward said first housing surface and wherein said limited range of movement is about forty-five to seventy degrees.

46. The gauge of claim 44 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

47. The gauge of claim 45 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

48. The gauge of claim 44 further comprising a pointer indicating the degree of pivoted movement of said stop.

49. A gauge for measuring a distance between a first surface and a second surface, consisting essentially of:
   a housing possessing a first housing surface adapted to abut against said first measuring surface;
   a stop mounted on said housing and moveable extensibly away from or toward said first housing surface, said stop having a limited range of movement between a retracted position closest to said first housing surface and an extreme extended position farthest from said first housing surface;
   means for biasing said stop member toward said extreme extended position; and
   means for selectively inhibiting movement of said stop, whereby when said first housing surface abuts against said first surface and when said stop abuts said second surface, the amount of extension of said stop within said range measures said distance.

50. The gauge of claim 49 wherein said stop is pivotably mounted on said housing and pivotably moves extensibly away from or toward said first housing surface and wherein said limited range of movement is about forty-five to seventy degrees.

51. The gauge of claim 49 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

52. The gauge of claim 50 wherein said housing includes an aperture, and wherein said inhibiting means includes a button adapted to protrude into said aperture, a plate connected to said button, adapted for frictional engagement with said stop, and adapted to move concurrently with said button, and a compression coil spring adapted to selectively compress said plate against said stop such that when said button protruding into said aperture is depressed, said plate moves against the compression of said spring away from frictional engagement with said stop, and said biasing means moves said stop to an extensibly upward position.

53. The gauge of claim 49 further consisting essentially of a pointer indicating the degree of pivoted movement of said stop.

54. A gauge for measuring a distance between a first object and a second object comprising:
    a housing possessing a first surface adapted to abut against said first object;
    an arm pivotably mounted on said housing, said arm having an end about which said arm pivots and having a distal end pivotable away from or toward said first surface;
    means for biasing said distal end away from said first surface;
    means for selectively inhibiting pivoted movement of said arm;
    means for indicating the distance between said distal end of said arm and said first surface, whereby when said first surface abuts against said first object and when said distal end of said arm abuts said second object, said indicating means also indicates the distance between said first object and said second object.

55. The gauge of claim 54 wherein said arm is pivotable relative to said housing through a limited range of arcuate motion and wherein said arcuate range is between about forty-five to seventy degrees.

56. The gauge of claim 54 further comprising a pointer indicating the degrees of pivoted movement of said arm.

57. A gauge for measuring a distance between a first object and a second object consisting essentially of:
    a housing possessing a first surface adapted to abut against said first object;
    an arm pivotably mounted on said housing, said arm having an end about which said arm pivots and having a distal end and pivotable away from or toward said first surface;
    means for biasing said distal end away from said first surface;
    means for selectively inhibiting pivoted movement of said arm;
    means for indicating the distance between said distal end of said arm and said first surface, whereby when said first surface abuts against said first object and when said distal end of said arm abuts said second object, said indicating means also indicates the distance between said first object and said second object.

58. The gauge of claim 57 wherein said arm is pivotable relative to said housing through a limited range of arcuate motion and wherein said arcuate range is between about forty-five to seventy degrees.

59. The gauge of claim 57 further consisting essentially of a pointer indicating the degrees of pivoted movement of said arm.

60. A method of measuring a distance between a first object and a second object comprising the steps of:
    providing a gauge comprising
        (a) a housing possessing a first surface adapted to abut against said first object;
        (b) an arm pivotably mounted on said housing, said arm having an end about which said arm pivots and having a distal end pivotable away from or toward said first surface;
        (c) means for biasing said distal end away from said first surface; and
        (d) manually manipulated means for selectively inhibiting pivoted movement of said arm;
    manually manipulating said inhibiting means such that pivoted movement of said arm is not inhibited and such that said biasing means causes said distal end to pivotably move away from said first surface;
    positioning said gauge such that said first surface abuts said first object and said distal end of said arm abuts said second object;
    after said positioning step, causing said inhibiting means to inhibit pivoted movement of said arm;
    after said causing step, removing said gauge from said position;
    after said causing step, measuring the distance said distal end of said arm is away from said first surface.

61. The method of claim 60 wherein said first object comprises a substantially planar surface upon which a vehicle is resting and whereby said second object comprises a frame or other portion of the carriage of said vehicle.

62. The method of claim 61 wherein said distance is in the range of about three inches to eight inches.

63. The method of claim 60 wherein said gauge includes a pointer indicating the degree of pivoted movement of said arm and a scale operatively interactive with said pointer and indicating the distance said distal end of said arm or away from said first surface.

64. A method of measuring a distance between a first object and a second object comprising the steps of:
    providing a gauge consisting essentially of:
        (a) a housing possessing a first surface adapted to abut against said first object;
        (b) an arm pivotably mounted on said housing, said arm having an end about which said arm pivots and having a distal end pivotable away from or toward said first surface;
        (c) means for biasing said arm away from said first surface; and
        (d) manually manipulated means for selectively inhibiting pivoted movement of said arm;
    manually manipulating said inhibiting means such that pivoted movement of said arm is not inhibited and such that said biasing means causes said distal end to pivotably move away from said first surface;
    positioning said gauge such that said first surface abuts said first object and said distal end of said arm abuts said second object;
    after said positioning step, causing said inhibiting means to inhibit pivoted movement of said arm;
    after said causing step, removing said gauge from said position;

after said causing step, measuring the distance said distal end of said arm is away from said first surface.

65. The method of claim 64 wherein said first object comprises a substantially planar surface upon which a vehicle is resting and whereby said second object comprises a frame or other portion of the carriage of said vehicle.

66. The method of claim 65 wherein said distance is in the range of about three inches to eight inches.

67. The method of claim 64 wherein said gauge includes a pointer indicating the degree of pivoted movement of said arm and a scale operatively interactive with said pointer and indicating the distance said distal end of said arm is away from said first surface.

* * * * *